(12) United States Patent
Zhao

(10) Patent No.: US 8,198,854 B2
(45) Date of Patent: Jun. 12, 2012

(54) STARTING CIRCUIT FOR SINGLE-PHASE AC MOTOR AND METHOD FOR STARTING SINGLE-PHASE AC MOTOR

(75) Inventor: Yong Zhao, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 428 days.

(21) Appl. No.: 12/638,968

(22) Filed: Dec. 15, 2009

(65) Prior Publication Data
US 2010/0207569 A1    Aug. 19, 2010

(30) Foreign Application Priority Data

Feb. 17, 2009   (CN) .......................... 2009 1 0037337

(51) Int. Cl.
*H02P 1/40*   (2006.01)
(52) U.S. Cl. ........ 318/786; 318/787; 318/774; 318/778; 318/779; 318/785
(58) Field of Classification Search .................. 318/786, 318/774, 778, 779, 785, 787
See application file for complete search history.

(56) References Cited

U.S. PATENT DOCUMENTS

| | | | | | |
|---|---|---|---|---|---|
| 3,882,364 | A | * | 5/1975 | Wright et al. | 318/786 |
| 4,843,295 | A | * | 6/1989 | Thompson et al. | 318/786 |
| 4,862,053 | A | * | 8/1989 | Jordan et al. | 318/786 |
| 5,038,091 | A | * | 8/1991 | Bashark | 318/809 |
| 5,159,255 | A | * | 10/1992 | Weber | 318/775 |
| 5,280,227 | A | * | 1/1994 | Bashark | 318/751 |
| 5,325,034 | A | * | 6/1994 | Reynolds et al. | 318/782 |
| 5,892,349 | A | * | 4/1999 | Bogwicz et al. | 318/772 |
| 6,756,756 | B1 | * | 6/2004 | Chmiel et al. | 318/430 |
| 6,950,029 | B2 | * | 9/2005 | Enzinna | 340/607 |
| 7,095,207 | B1 | * | 8/2006 | Min | 318/786 |

* cited by examiner

*Primary Examiner* — Rita Leykin
(74) *Attorney, Agent, or Firm* — Matthias Scholl P.C.; Matthias Scholl

(57) ABSTRACT

A starting circuit for a single-phase AC motor, the single-phase AC motor comprising a main winding and a starting winding, and the starting circuit comprising a detecting circuit, a rectifying circuit, a triggering circuit, and a switch, wherein the detecting circuit is connected in series with the main winding, the switch is connected in series with the starting winding, the detecting circuit transfers current parameters of the main winding into detecting signals, the rectifying circuit processes the detecting signals and transmits the detecting signals to the triggering circuit, the triggering circuit controls the switch according to the detecting signals whereby controlling power-on and power-off of the starting winding, and the triggering circuit is a hysteresis comparing circuit.

9 Claims, 4 Drawing Sheets

STARTING CIRCUIT FOR SINGLE-PHASE AC MOTOR AND METHOD FOR STARTING SINGLE-PHASE AC MOTOR

CROSS-REFERENCE TO RELATED APPLICATIONS

Pursuant to 35 U.S.C. §119 and the Paris Convention Treaty, this application claims the benefit of Chinese Patent Application No. 200910037337.9 filed on Feb. 17, 2009, the contents of which are incorporated herein by reference.

BACKGROUND OF THE INVENTION

1. Field of the Invention

The method relates to a starting circuit and a starting method for a single-phase AC motor.

2. Description of the Related Art

Starting circuits are widely used in single-phase AC motors. However, there are several non-neglectable problems with the starting circuits: they have complex structure, high production cost, and poor reliability.

Meanwhile, conventional methods for starting the single-phase AC motors have some disadvantages: they have complex processing and thus are difficult to be facilitated, and affects reliability of the single-phase AC motors.

SUMMARY OF THE INVENTION

In view of the above-described problem, it is one objective of the invention to provide a starting circuit for a single-phase AC motor that features simple structure, low production cost, and good reliability.

It is another objective of the invention to provide a method for starting a single-phase AC motor that features simple processing and thus is easy to be facilitated, and guarantees high reliability of the single-phase AC motor.

To achieve the above objectives, in accordance with one embodiment of the invention, provided is a starting circuit for a single-phase AC motor, the single-phase AC motor comprising a main winding and a starting winding, and the starting circuit comprising a detecting circuit, a rectifying circuit, a triggering circuit, and a switch, wherein the detecting circuit is connected in series with the main winding, the switch is connected in series with the starting winding, the detecting circuit transfers current parameters of the main winding into detecting signals, the rectifying circuit processes the detecting signals and transmits the detecting signals to the triggering circuit, the triggering circuit controls the switch according to the detecting signals whereby controlling power-on and power-off of the starting winding, and the triggering circuit is a hysteresis comparing circuit.

In a class of this embodiment, an optical coupling circuit is connected to the triggering circuit.

In a class of this embodiment, the optical coupling circuit operates to drive the switch.

In a class of this embodiment, the switch is a bidirectional thyristor.

In a class of this embodiment, the rectifying circuit transmits the detecting signals to an input end of the triggering circuit.

In accordance with another embodiment of the invention, provided is a method for starting a single-phase AC motor, comprising providing starting circuit for a single-phase AC motor, the single-phase AC motor comprising a main winding and a staring winding, and the starting circuit comprising a detecting circuit, a hysteresis comparing circuit, and a switch, determining a first critical speed corresponding to switch-off of the switch, a first voltage of the switch corresponding to the first critical speed, a second critical speed corresponding to switch-on of the switch, and a second voltage of the switch corresponding to the second critical speed by the hysteresis comparing circuit, detecting an operating current of the main winding by the detecting circuit, transforming the operating current into a voltage signal and inputting the voltage signal to an input pin of the hysteresis comparing circuit by the detecting circuit, and controlling the starting winding to operate according to a rotation speed of the single-phase AC motor by the hysteresis comparing circuit.

In a class of this embodiment, the step of controlling the starting winding to operate according to a rotation speed of the single-phase AC motor by the hysteresis comparing circuit comprises: controlling the switch to switch on as a rotation speed of the single-phase AC motor arises from zero and the voltage signal is greater than the first voltage, controlling the switch to switch off as a rotation speed of the single-phase AC motor is equal to or greater than the first critical speed and the voltage signal is less than the second voltage, and controlling the switch to switch on as a rotation speed of the single-phase AC motor is less than or equal to the second critical speed and the voltage signal is greater than the first voltage.

In accordance with a further embodiment of the invention, provided is a method for starting a single-phase AC motor, comprising providing starting circuit for a single-phase AC motor, the single-phase AC motor comprising a main winding and a staring winding, and the starting circuit comprising a detecting circuit, a microprocessor unit, and a switch, determining a first critical speed corresponding to switch-off of the switch, a first voltage of the switch corresponding to the first critical speed, a second critical speed corresponding to switch-on of the switch, and a second voltage of the switch corresponding to the second critical speed by the microprocessor unit, detecting an operating current of the main winding by the detecting circuit, transforming the operating current into a voltage signal and inputting the voltage signal to an input pin of the microprocessor unit by the detecting circuit, and controlling the starting winding to operate according to a rotation speed of the single-phase AC motor by the microprocessor unit.

In a class of this embodiment, the step of controlling the starting winding to operate according to a rotation speed of the single-phase AC motor by the microprocessor unit comprises: controlling the switch to switch on as a rotation speed of the single-phase AC motor arises from zero and the voltage signal is greater than the first voltage, controlling the switch to switch off as a rotation speed of the single-phase AC motor is equal to or greater than the first critical speed and the voltage signal is less than the second voltage, and controlling the switch to switch on as a rotation speed of the single-phase AC motor is less than or equal to the second critical speed and the voltage signal is greater than the first voltage.

Advantages of the method for starting a single-phase AC motor comprise: control of the motor is implemented via hysteresis control, which improves control functions, makes a control process more simple and practical, and guarantees high reliability of the single-phase AC motor.

BRIEF DESCRIPTION OF THE DRAWINGS

The invention is described hereinafter with reference to accompanying drawings, in which.

DETAILED DESCRIPTION OF THE EMBODIMENTS

Figure 1:
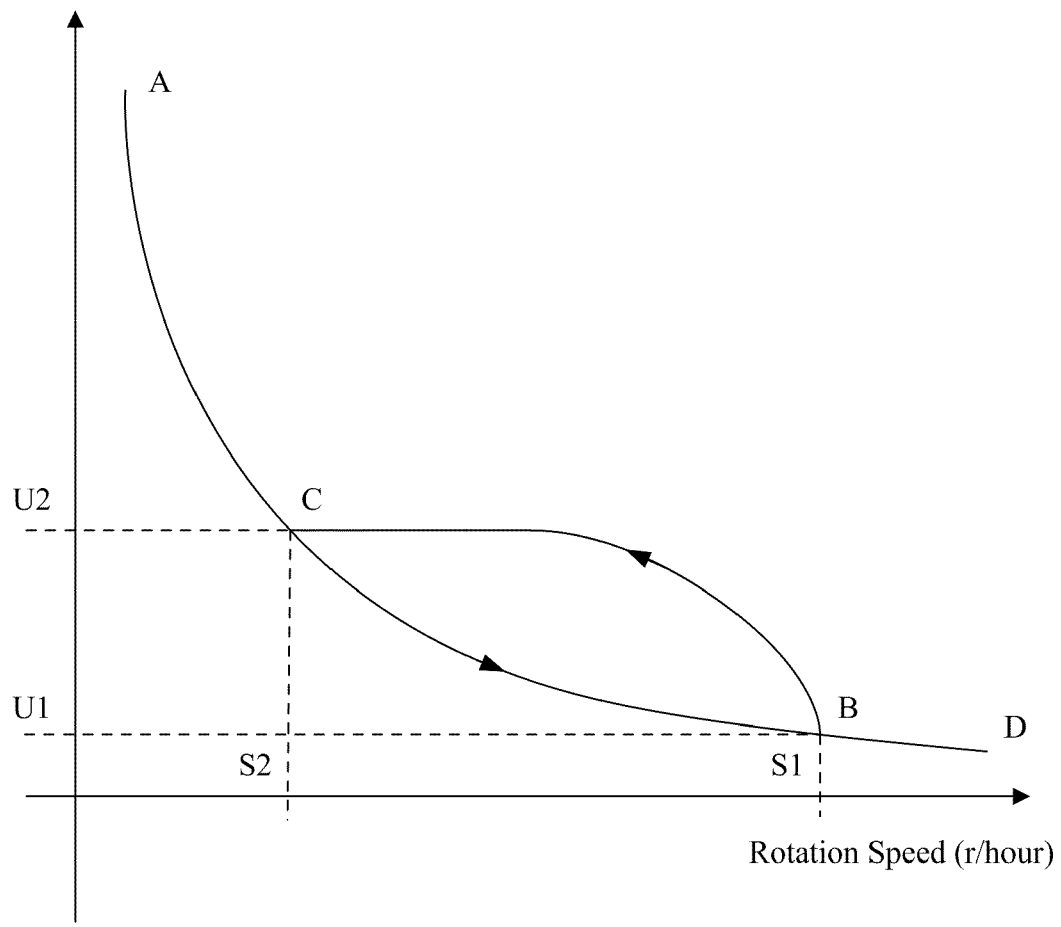
FIG. 1 illustrates a relationship between a rotation speed of a single-phase AC motor and a main winding.
Figure 2:
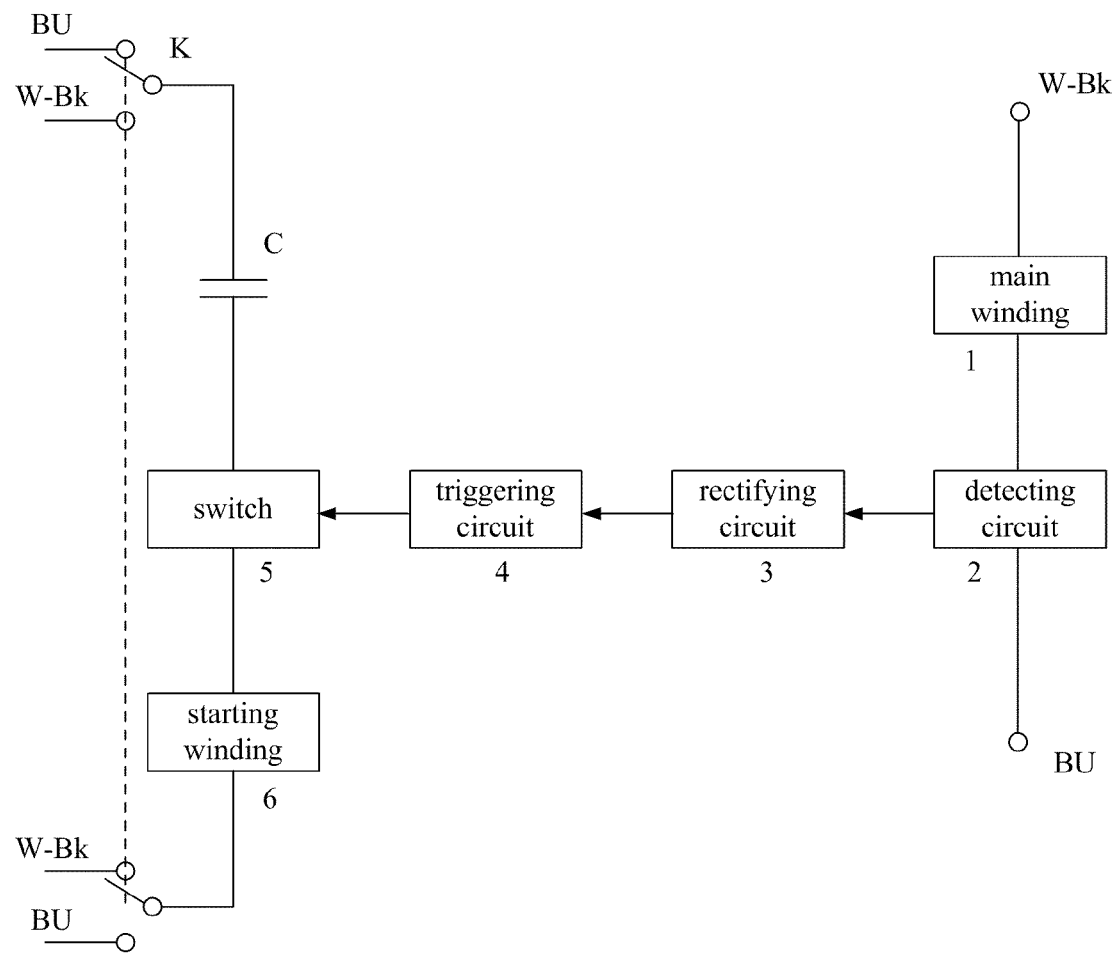
FIG. 2 is a block diagram of a starting circuit for a single-phase AC motor of an exemplary embodiment of the invention.

As shown in FIGS. 1 and 2, a starting circuit for a single-phase AC motor comprises a detecting circuit 2, a rectifying circuit 3, a triggering circuit 4, and a switch 5. The single-phase AC motor comprises a main winding 1 and a starting winding 6.

The detecting circuit 2 is connected in series with the main winding 1.

The switch 5 is connected in series with the starting winding 6.

The detecting circuit 2 transfers current parameters of the main winding 1 into detecting signals, the rectifying circuit 3 processes the detecting signals and transmits the detecting signals to the triggering circuit 4, and the triggering circuit 4 controls the switch 5 according to the detecting signals whereby controlling power-on and power-off of the starting winding 6.

In this embodiment, the triggering circuit 4 is a hysteresis comparing circuit, and the switch 5 is a bidirectional thyristor.

Figure 3:
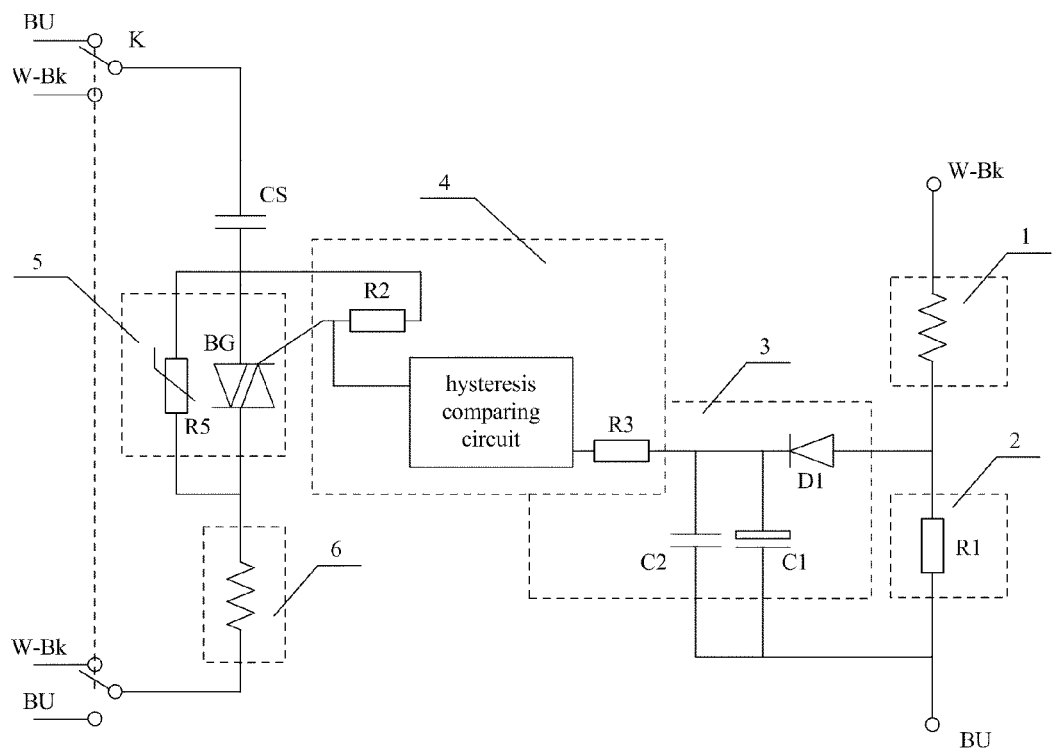
FIG. 3 is a schematic diagram of a starting circuit for a single-phase AC motor of an exemplary embodiment of the invention.
Figure 4:
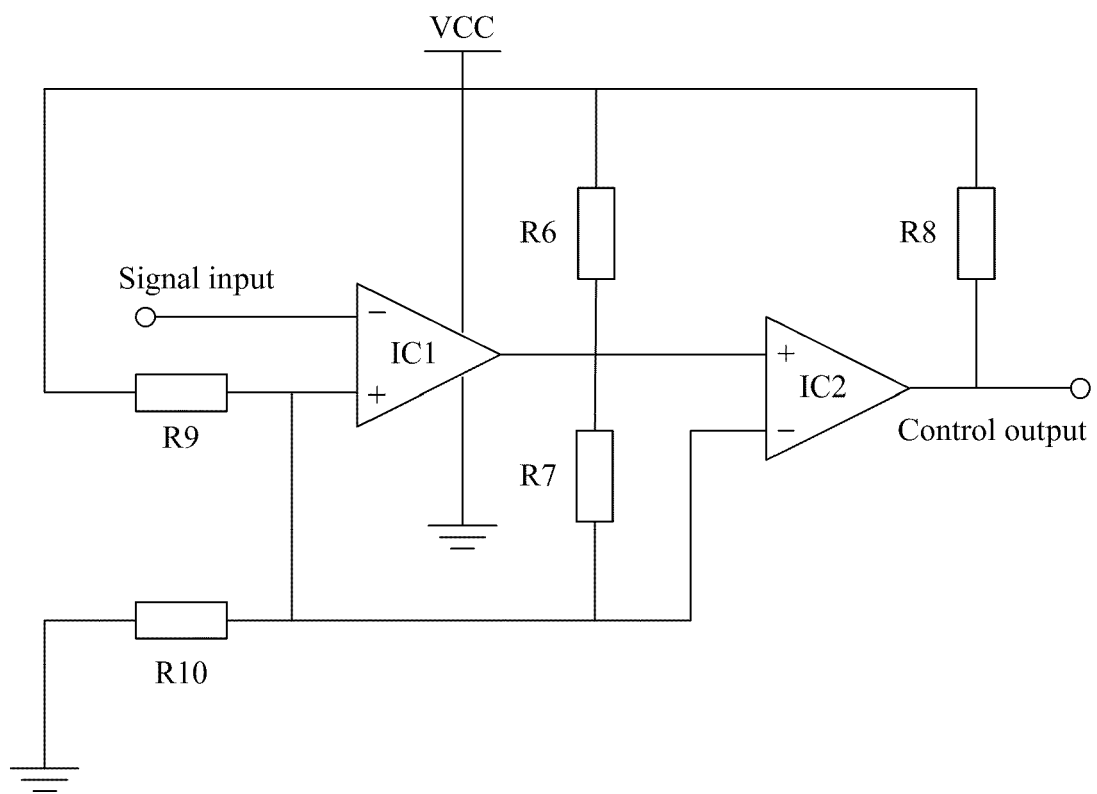
FIG. 4 is a schematic diagram of a hysteresis comparing circuit of an exemplary embodiment of the invention.

As shown in FIGS. 3 and 4, a method for starting a single-phase AC motor of a first embodiment of the invention comprises providing starting circuit for a single-phase AC motor, the single-phase AC motor comprising a main winding 1 and a staring winding 6, and the starting circuit comprising a detecting circuit 2, a hysteresis comparing circuit 4, and a switch 5, determining a first critical speed corresponding to switch-off of the switch 5, a first voltage of the switch 5 corresponding to the first critical speed, a second critical speed corresponding to switch-on of the switch 5, and a second voltage of the switch 5 corresponding to the second critical speed by the hysteresis comparing circuit 4, detecting an operating current of the main winding 1 by the detecting circuit 2, transforming the operating current into a voltage signal and inputting the voltage signal to an input pin of the hysteresis comparing circuit 4 by the detecting circuit 2, and controlling the starting winding 6 to operate according to a rotation speed of the single-phase AC motor by the hysteresis comparing circuit 4.

The step of controlling the starting winding 6 to operate according to a rotation speed of the single-phase AC motor by the hysteresis comparing circuit 4 comprises: controlling the switch 5 to switch on as a rotation speed of the single-phase AC motor arises from zero and the voltage signal is greater than the first voltage, controlling the switch 5 to switch off as a rotation speed of the single-phase AC motor is equal to or greater than the first critical speed and the voltage signal is less than the second voltage, and controlling the switch 5 to switch on as a rotation speed of the single-phase AC motor is less than or equal to the second critical speed and the voltage signal is greater than the first voltage.

A method for starting a single-phase AC motor of a second embodiment of the invention comprises providing starting circuit for a single-phase AC motor, the single-phase AC motor comprising a main winding 1 and a staring winding 6, and the starting circuit comprising a detecting circuit 2, a microprocessor unit 4, and a switch 5, determining a first critical speed corresponding to switch-off of the switch 5, a first voltage of the switch 5 corresponding to the first critical speed, a second critical speed corresponding to switch-on of the switch 5, and a second voltage of the switch 5 corresponding to the second critical speed by the microprocessor unit 4, detecting an operating current of the main winding 1 by the detecting circuit 2, transforming the operating current into a voltage signal and inputting the voltage signal to an input pin of the microprocessor unit 4 by the detecting circuit 2, and controlling the starting winding 6 to operate according to a rotation speed of the single-phase AC motor by the microprocessor unit 4.

The step of controlling the starting winding 6 to operate according to a rotation speed of the single-phase AC motor by the microprocessor unit 4 comprises: controlling the switch 5 to switch on as a rotation speed of the single-phase AC motor arises from zero and the voltage signal is greater than the first voltage, controlling the switch 5 to switch off as a rotation speed of the single-phase AC motor is equal to or greater than the first critical speed and the voltage signal is less than the second voltage, and controlling the switch 5 to switch on as a rotation speed of the single-phase AC motor is less than or equal to the second critical speed and the voltage signal is greater than the first voltage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A starting circuit for a single-phase AC motor, the single-phase AC motor comprising a main winding (1) and a starting winding (6), said starting circuit comprising:
a detecting circuit (2);
a rectifying circuit (3);
a triggering circuit (4); and
a switch (5);
wherein
said detecting circuit (2) is connected in series with said main winding (1);
said switch (5) is connected in series with said starting winding (6);
said detecting circuit (2) transfers current parameters of said main winding (1) into detecting signals;
said rectifying circuit (3) processes said detecting signals and transmits said detecting signals to said triggering circuit (4);
said triggering circuit (4) controls said switch (5) according to said detecting signals whereby controlling power-on and power-off of said starting winding (6); and
said triggering circuit (4) is a hysteresis comparing circuit.

2. The starting circuit for a single-phase AC motor of claim 1, wherein an optical coupling circuit is connected to said triggering circuit (4).

3. The starting circuit for a single-phase AC motor of claim 2, wherein said optical coupling circuit operates to drive said switch (5).

4. The starting circuit for a single-phase AC motor of claim 1, wherein said switch is a bidirectional thyristor.

5. The starting circuit for a single-phase AC motor of claim 1, wherein said rectifying circuit (3) transmits said detecting signals to an input end of said triggering circuit (4).

6. A method for starting a single-phase AC motor, comprising providing a starting circuit of claim 1;
  determining a first critical speed corresponding to switch-off of said switch, a first voltage of said switch corresponding to said first critical speed, a second critical speed corresponding to switch-on of said switch, and a second voltage of said switch corresponding to said second critical speed by said hysteresis comparing circuit;
  detecting an operating current of said main winding by said detecting circuit;
  transforming said operating current into a voltage signal and inputting said voltage signal to an input pin of said hysteresis comparing circuit by said detecting circuit; and
  controlling said starting winding to operate according to a rotation speed of said single-phase AC motor by said hysteresis comparing circuit.

7. The method of claim 6, wherein the step of controlling said starting winding to operate according to a rotation speed of said single-phase AC motor by said hysteresis comparing circuit comprises:
  controlling said switch to switch on as a rotation speed of said single-phase AC motor arises from zero and said voltage signal is greater than said first voltage;
  controlling said switch to switch off as a rotation speed of said single-phase AC motor is equal to or greater than said first critical speed and said voltage signal is less than said second voltage; and
  controlling said switch to switch on as a rotation speed of said single-phase AC motor is less than or equal to said second critical speed and said voltage signal is greater than said first voltage.

8. A method for starting a single-phase AC motor, comprising:
  providing a starting circuit of claim 1;
  determining a first critical speed corresponding to switch-off of said switch, a first voltage of said switch corresponding to said first critical speed, a second critical speed corresponding to switch-on of said switch, and a second voltage of said switch corresponding to said second critical speed by said microprocessor unit;
  detecting an operating current of said main winding by said detecting circuit;
  transforming said operating current into a voltage signal and inputting said voltage signal to an input pin of said microprocessor unit by said detecting circuit; and
  controlling said starting winding to operate according to a rotation speed of said single-phase AC motor by said microprocessor unit.

9. The method of claim 6, wherein the step of controlling said starting winding to operate according to a rotation speed of said single-phase AC motor by said microprocessor unit comprises:
  controlling said switch to switch on as a rotation speed of said single-phase AC motor arises from zero and said voltage signal is greater than said first voltage;
  controlling said switch to switch off as a rotation speed of said single-phase AC motor is equal to or greater than said first critical speed and said voltage signal is less than said second voltage; and
  controlling said switch to switch on as a rotation speed of said single-phase AC motor is less than or equal to said second critical speed and said voltage signal is greater than said first voltage.

* * * * *